C. W. LANDRUM & G. W. WRIGHT.
ROTARY IMPELLING PUMP.
APPLICATION FILED JAN. 4, 1909.
929,230.
Patented July 27, 1909.
2 SHEETS—SHEET 2.
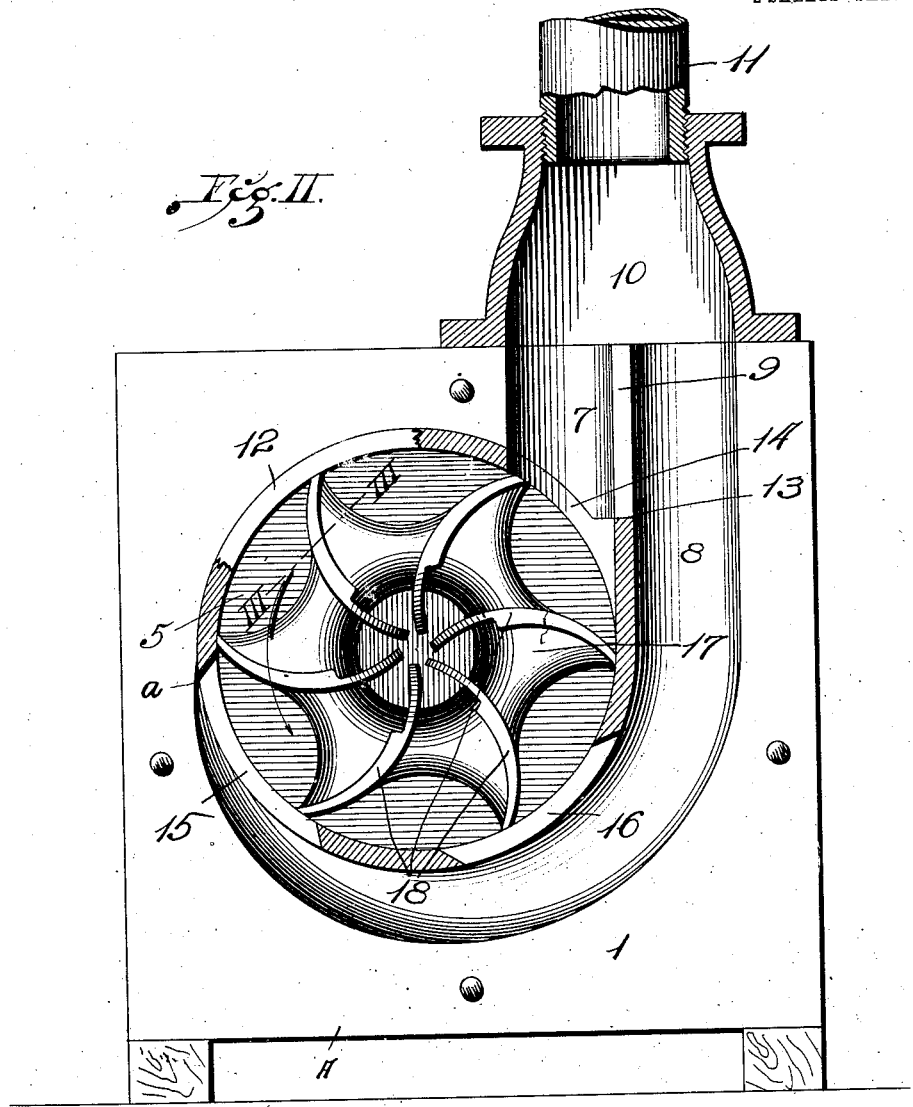
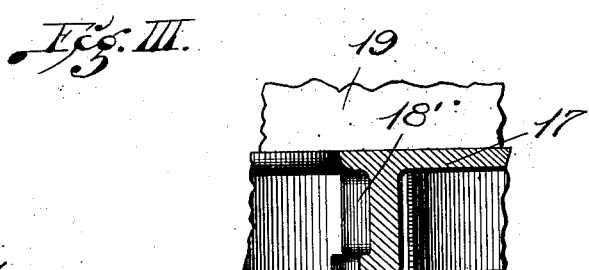

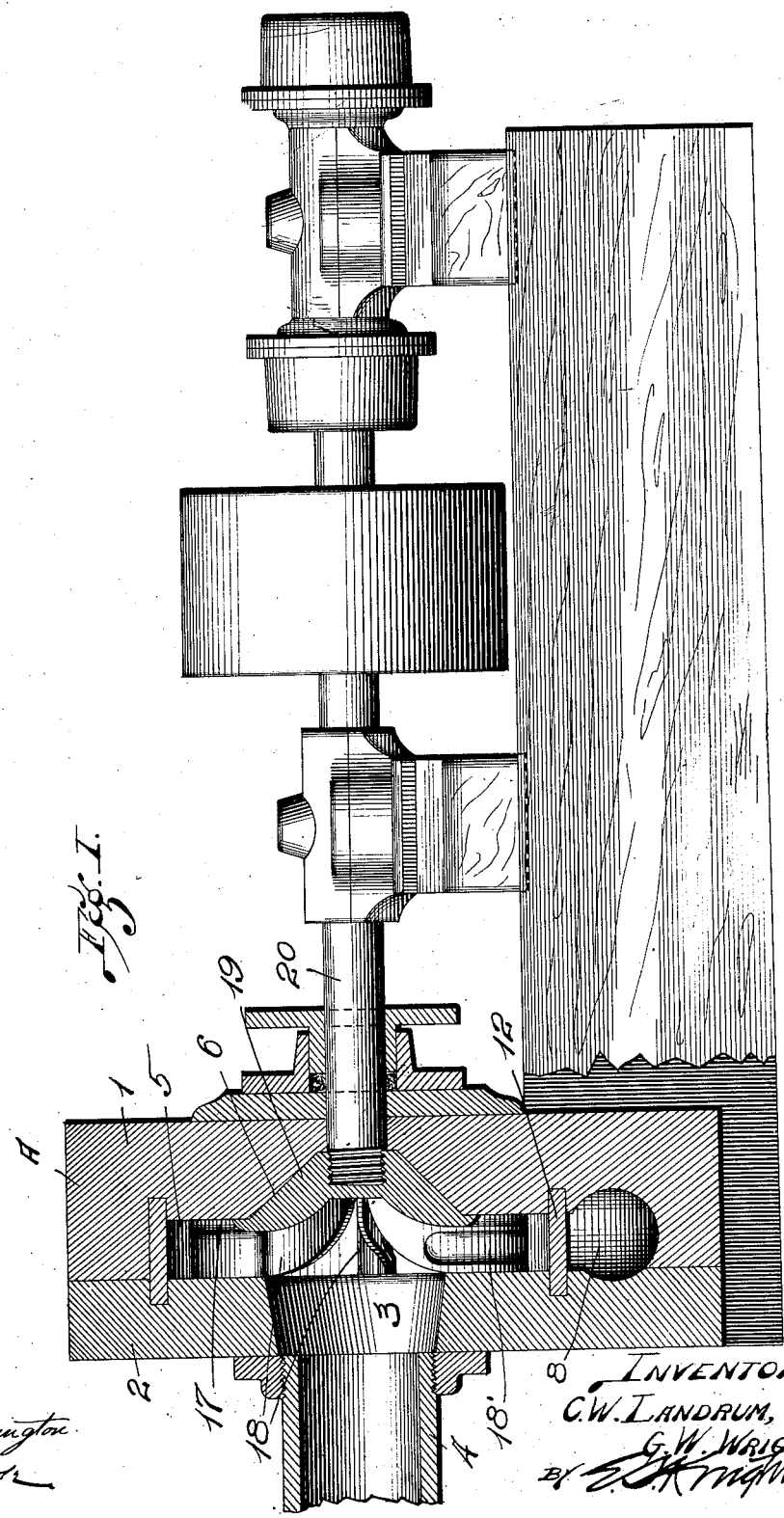

UNITED STATES PATENT OFFICE.

CHARLES W. LANDRUM AND GEORGE W. WRIGHT, OF WEBB CITY, MISSOURI.

ROTARY IMPELLING-PUMP.

No. 929,230.  Specification of Letters Patent.  Patented July 27, 1909.

Application filed January 4, 1909. Serial No. 470,700.

*To all whom it may concern:*

Be it known that we, CHARLES W. LANDRUM and GEORGE W. WRIGHT, citizens of the United States of America, residing at Webb City, in the county of Jasper and State of Missouri, have invented certain new and useful Improvements in Rotary Impelling-Pumps, of which the following is a full, clear, and exact description, reference being had to the accompanying drawings, forming part of this specification.

Our invention relates to a pump having a rotary impelling wheel and bowl of peculiar construction and the invention has for its object the production of a pump of high efficiency, and capable of operating against a very high head of water, whereby a positive and continuous flow of water in large volume may be constantly maintained during the operation of the pump that is the equivalent of the flow derived from a gang of centrifugal pumps. To provide for the attainment of the object mentioned, our pump includes a bowl containing a plurality of channels through which the water may be independently ejected after entrance into the bowl and an impelling wheel within the bowl whereby the water is forcibly driven into each channel without the occurrence of backward flow or slippage of the water.

Figure I is in part a side elevation and in part a vertical longitudinal section of our pump. Fig. II is a vertical cross section through the bowl of the pump with one of the sections of the bowl removed. Fig. III is a cross section through the impelling wheel on line III—III, Fig. II.

In the accompanying drawings: A designates the bowl of our pump which is composed of sections 1 and 2 that are suitably secured to each other. In the bowl section 2 is an inwardly flaring water inlet opening 3 through which water may find entrance into the bowl from a suitable conducting pipe 4 attached to said bowl section, as seen in Fig. I. Within the bowl A is an impelling wheel chamber 5 that is provided with a lateral concavity or extension 6 located in the bowl section 1 and in which the flanged and correspondingly shaped conical hub of the impelling wheel operates.

7 and 8 are inner and outer outlet channels within the bowl A, these channels being preferably produced in part in the bowl section 1 and in part in the bowl section 2. The inner outlet channel 7 extends upwardly in the bowl from the impelling wheel chamber, while the outer outlet channel 8 extends in a curved direction from a point *a*, (see Fig. II,) at one side of the bowl, therefrom in a course beneath the impelling wheel chamber, and then upwardly in a line parallel to the outlet channel 7. The two outlet channels are separated at the top of the bowl by a partition 9 in order that separate flows of water may be occasioned through the channels until the water is discharged from the bowl into a receiver 10 having communication with both of the channels and having connected to it a discharge pipe 11 through which the water is conducted to the point at which it is delivered.

12 designates a housing ring seated in the impelling wheel chamber and extending across the sections 1 and 2 and which matches at 13 with the partition 9 in the bowl A, thereby serving to complete separation of the outlet channel 8 from the outlet channel 7. In the housing ring is an outlet port 14 that provides communication between the impelling wheel chamber and the upper outlet channel 7, and said housing ring is also provided with outlet ports 15 and 16 that furnish communication between the impelling wheel chamber and the outlet channel 8.

17 designates an impelling wheel of star shape having curved peripheral recesses and forming points and provided with curved radial blades 18 which extend from the flanged hub 19 located at the rear side of the wheel and occupying the extension 6 of the impelling wheel chamber in the bowl A, as seen in Fig. I. The hub of the impelling wheel has a central concavity at its forward side from which the blades of the wheel extend, the concavity being located directly in line with the inlet 3 of the bowl A in order that the water passing into the bowl through said inlet may enter into the said concavity, which serves as a water receiving pocket in the impelling wheel. The inner ends of the blades are disconnected and spaced apart. Each of the blades of the impelling wheel is provided with a longitudinal concavity 18', (see Figs. I and III,) that extends longitudinally of the blade, thereby preventing splitting of the water during the rotation of the impelling wheel in the operation of the pump.

The impelling wheel of our pump is operated by a suitable shaft 20 mounted in suitable bearings, and which may be driven by power applied to the shaft in any desirable manner.

In the practical use of our pump, the water to be pumped enters the bowl A through its inlet 3 and, due to the absence of any hub extension at the forward side of the impelling wheel, the water flows into the central concavity or pocket in said wheel and during the rotation of the wheel is acted upon by the wheel blades. These wheel blades by pressure upon the water as it moves outwardly from the pocket in the impelling wheel act to impel the water through the outlet ports 15, 16 and 14 in the housing ring 12 whereby the water is forcibly driven from the impelling wheel chamber into the separate channels 8 and 7. It will be seen that during this operation the impelling wheel blades impel the water through the outlet ports 15 and 16 into the channel 8 and through the outlet port 14 of the channel 7, the impelling action into each channel being independent of the impelling action into the other channel, with the consequence of producing a large volume of flow of water from the impelling wheel chamber.

The housing ring 12 is removably seated in the bowl A of our pump and, therefore, any housing ring previously in use may be readily removed from the bowl in the event of its becoming unfit for service.

We claim:

1. A pump of the character described comprising a bowl having an inlet, an impelling wheel chamber, an inner channel and an outer channel, both of the channels leading to a common point, a housing ring separating the wheel chamber and inner channel from the outer channel, and provided with a port leading to the inner channel and with ports leading to the outer channel and an impelling wheel of star shape having a central concavity, curved peripheral recesses forming points, and curved radial blades spaced apart at their inner ends and extending from the central concavity to the ends of the points.

2. A pump of the character described comprising a bowl having an inlet, an impelling wheel chamber, an inner channel and an outer channel, both of the channels leading to a common point, a housing ring separating the wheel chamber and inner channel from the outer channel, and provided with a port leading to the inner channel and with ports leading to the outer channel and an impelling wheel of star shape having a central concavity, curved peripheral recesses forming points, and curved radial blades having longitudinal concavities and spaced apart at their inner ends and extending from the central concavity to the ends of the points.

CHARLES W. LANDRUM.
GEORGE W. WRIGHT.

In the presence of—
A. G. YOUNG,
ETHEL WATSON.